Aug. 20, 1963

O. KILE ETAL

3,101,164

METHOD OF AND APPARATUS FOR CUTTING AND
FEEDING WRAPPERS FOR MAGAZINES

Filed May 17, 1960

Inventors:
Otho Kile
Bernard J. Golbeck
By: Nofgren, Brady, Wegner,
Allen & Stellman
Attorneys

United States Patent Office 3,101,164
Patented Aug. 20, 1963

3,101,164
METHOD OF AND APPARATUS FOR CUTTING AND FEEDING WRAPPERS FOR MAGAZINES
Otho Kile, Homewood, and Bernard J. Golbeck, Crystal Lake, Ill., assignors to R. R. Donnelley & Sons Company, a corporation of Delaware
Filed May 17, 1960, Ser. No. 29,697
14 Claims. (Cl. 225—2)

This invention relates to a method of and apparatus for cutting and feeding wrappers for magazines.

Magazine wrappers are customarily cut from a web of kraft paper, and each wrapper is mechanically wrapped around a magazine. Such paper has a grain which definitely runs longitudinally of the web, and tears much more easily longitudinally of the web than it does across the web. Accordingly, to provide a satisfactory wrapper it is essential that the length of the wrapper, which extends around the magazine, shall be a piece of paper which extends lengthwise of the web before cutting, so that a tear which starts at one edge of the wrapper will not easily extend all the way across it.

When a single mailing of a magazine may run to several million copies the cost of the wrappers becomes an extremely important factor, and economy of operation requires that paper be bought in rolls which are wide enough that the web provides several wrappers across its width.

Finally, it is desirable to adapt the mechanism for cutting and feeding the magazine wrappers, which may be relatively simple, to the relatively more complex wrapping mechanism, rather than to design a new wrapping mechanism which suits the requirements of the wrapper cutting and feeding apparatus.

The principal object of the present invention, therefore, is to provide a method of and apparatus for cutting and feeding wrappers for magazines which will cut a plurality of longitudinally extending wrappers out of a web of kraft paper and feed the wrappers serially to a conventional magazine wrapping mechanism.

Another object of the invention is to provide such apparatus in which the paper web is withdrawn continuously from a supply roll, and in which the wrappers cut from the web are moved continuously to the magazine wrapping mechanism.

Still another object of the invention is to provide such an apparatus which has only rotating parts, so as to avoid the problems of wear and vibration which are inherent in any mechanism having reciprocating elements.

Still another object of the invention to the provide such a mechanism which is very compact, and takes little floor space.

The invention is illustrated in a preferred embodiment in the accompanying drawings in which.

Figure 1:
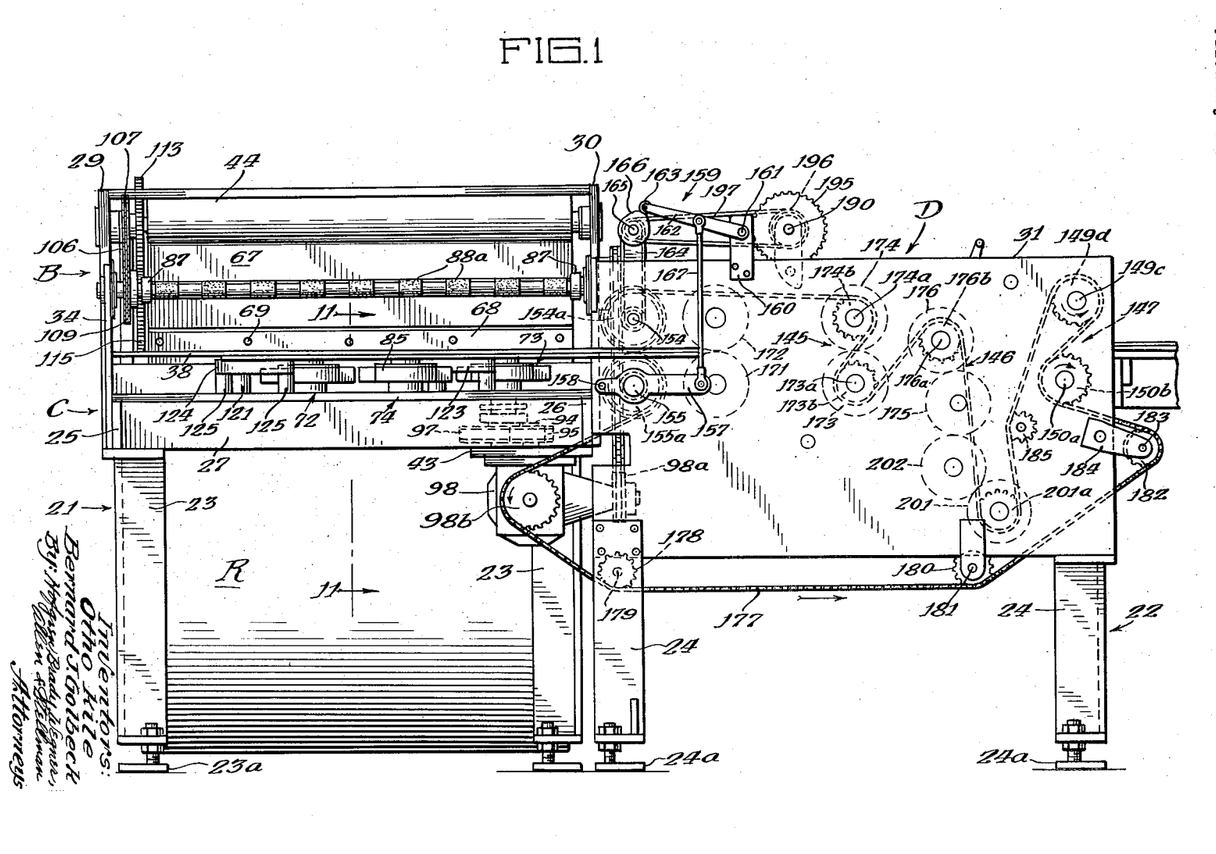
FIG. 1 is a front elevational view of a cutting and feeding apparatus for magazine wrappers, the feed from the supply roll being at the left of the drawing and the feed to the wrapping mechanism being toward the right of the drawing.
Figure 2:
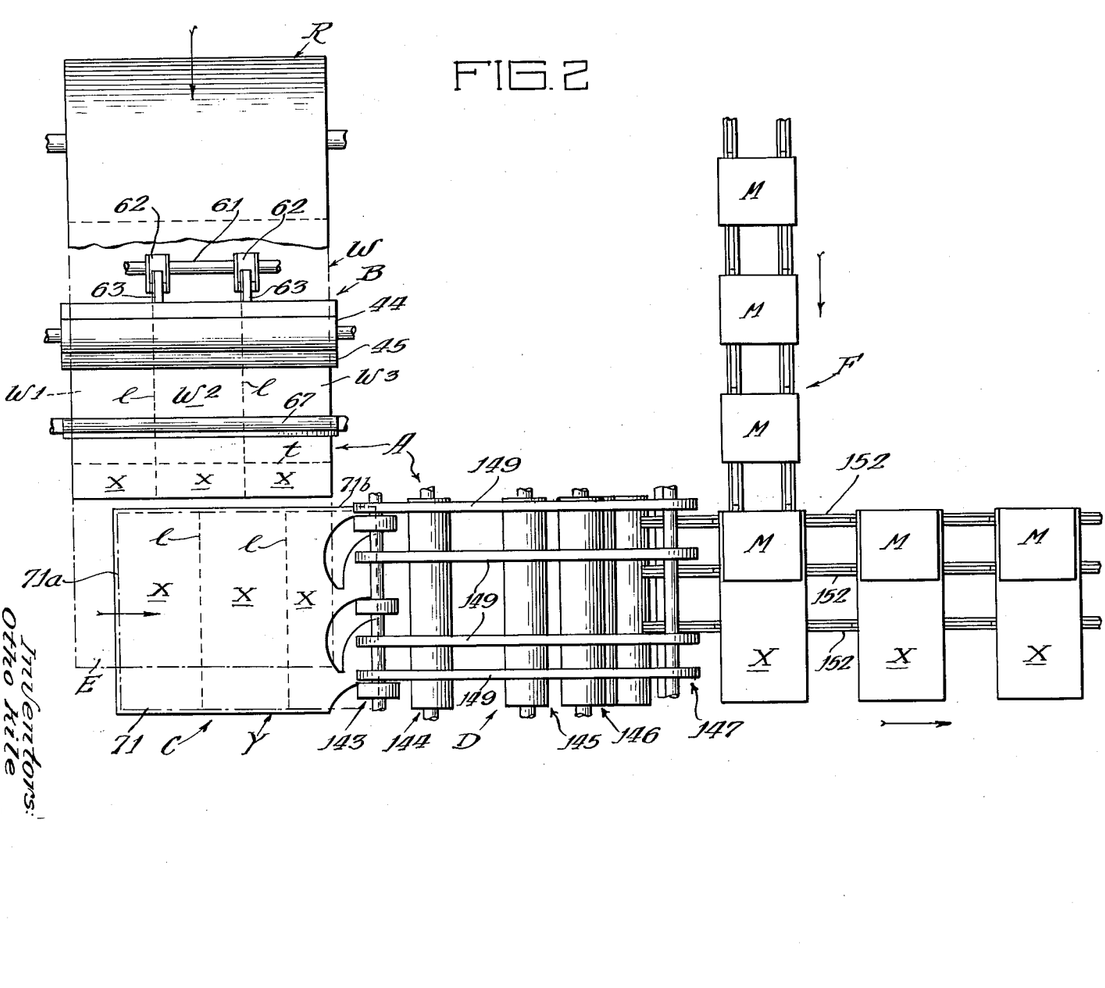
FIG. 2 is a schematic plan view of the apparatus and of the magazine delivery line, to show the relative positions of those elements.

Referring to the drawings in greater detail, and referring first to FIGURES 1 and 2, the apparatus of the present invention, indicated generally at A, includes a web feed and cutting section B, a transfer mechanism C, and a wrapper feed and imprinting section D which cooperate to deliver wrappers $x$ in timed coordination with the delivery of magazines M by a magazine feed F.

The general operation of the apparatus is to withdraw a paper web W continuously from a supply roll bar and form in it a pair of parallel longitudinal score lines $l$ to divide the web into three connected parallel wrapper webs $w1$, $w2$, and $w3$. The web is also scored transversely at regular intervals to form transverse score lines $t$ which divide the web into wrapper lengths, indicated generally at $y$, each of which contains three connected wrappers $x$ which are side by side.

As the leading edge E of the web is fed onto the transfer mechanism C it is acted upon by conventional bursters which burst the foremost wrapper length $y$ from the rest of the web and leave it upon a table which is part of the transfer mechanism.

The table executes translatory movement in a closed path, and serves to carry each wrapper length around a corner and into the nip of forwarding rolls which feed it at right angles to the line of travel of the web. A burster mechanism in the feed and imprinting section D bursts the wrapper length $y$ successively along the longitudinal score lines $l$ to segregate the three individual wrappers $x$ from one another to provide a succession of spaced wrappers which are delivered serially to be associated with the magazines M coming from magazine feed F. The successive wrappers and associated magazines are then fed to conventional magazine wrapping machine (not shown).

Figure 3:
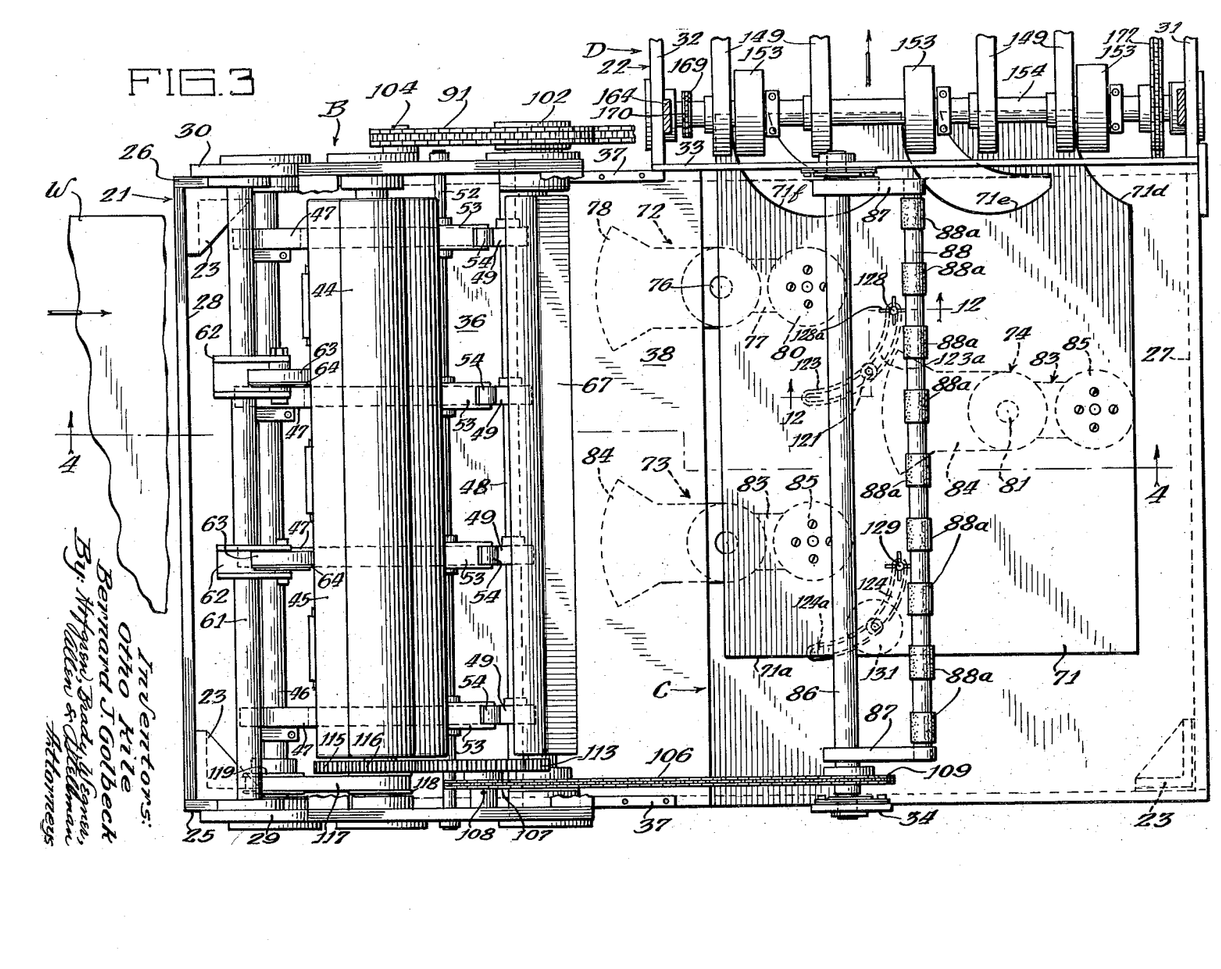
FIG. 3 is a fragmentary plan view of the web cutter and transfer table portions of the apparatus.
Figure 5:
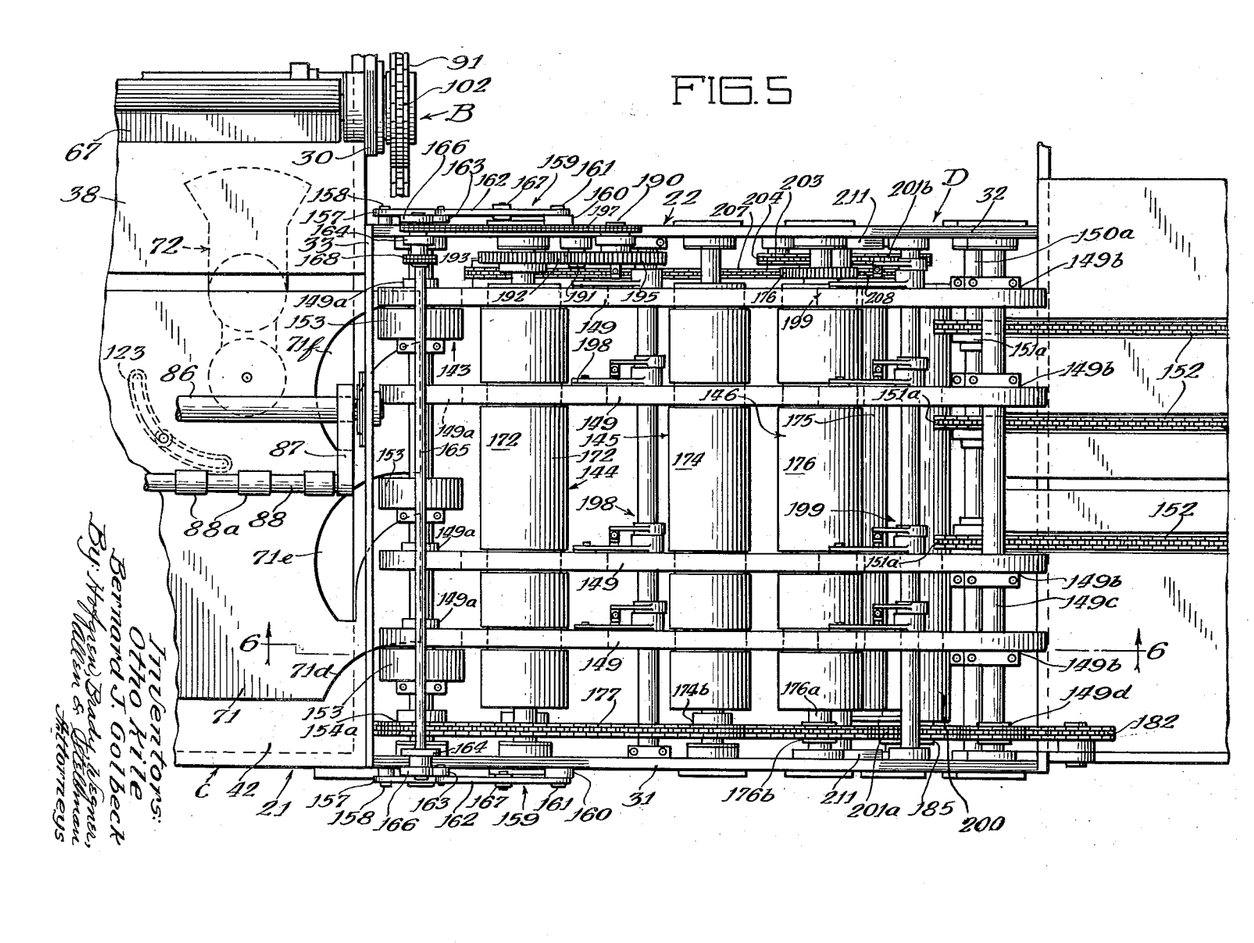
FIG. 5 is a fragmentary plan view of the mechanism which receives the wrappers from the transfer table and delivers the wrappers in spaced relationship to carrier chains for conveying to the wrapping mechanism.

As best seen FIGS. 1, 3 and 5, the present apparatus has a pair of rectangular frames, indicated generally at 21 and 22, the first of which supports the infeed mechanism A and the transfer mechanism C, and the second of which supports the wrapper feed and imprint mechanism D. Frame 21 has a post 23 at each corner provided with adjustable feed 23a, while frame 22 has similar corner legs 24 with adjustable feed 24a.

Figure 4:
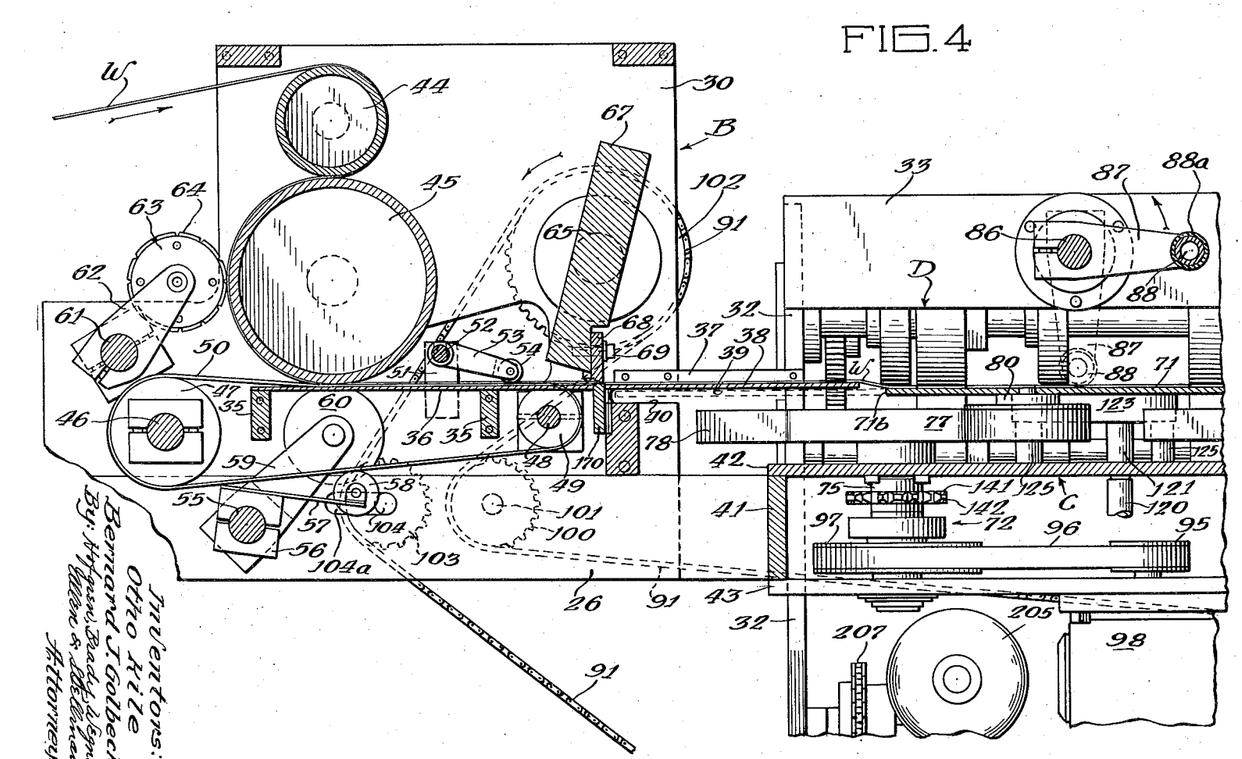
FIG. 4 is a fragmentary section taken substantially as illustrated along the line 4—4 of FIG. 3, the maximum travel of the transfer table from the infeed being shown in full lines and its maximum travel toward the infeed being in broken lines, while a burster is shown in full lines with a broken line showing of its position when bursting the web.

Referring now particularly to FIGS. 1, 3 and 4, frame 21 is seen to include a rectangular base supported directly on top of legs 23, and including an outer side plate 25, an inner side plate 26, a front plate 27 and a back plate 28. Mounted upon outer side plate 25 is an upstanding outer roller support bracket 29, while inner side plate 26 supports a companion inner roller bracket 30, said brackets carrying the feed and scoring rollers, as will be described in detail hereafter.

Rectangular frame 22 has a pair of side plates 31 and 32 which support the entire wrapper feed and imprinting mechanism, while a cross plate 33 supported on side plates 31 and 32 cooperates with an upright burster bracket 34 on outer side plate 25 of frame 21 to support a sheet length burster.

As best seen in FIGURE 4, cross members 35 extending between roller brackets 29 and 30 support a first infeed platform 36, while side brackets 37 support a feed platform 38 which is slightly spaced from platform 36 and has a recess 39 therebeneath in register with a slot 40 in side bracket 30.

Also as seen in FIGURE 4, a cross member 41 extends between outer side plate 25 and inner side plate 26, and cooperates with front frame plate 27 and with said two side plates to support a top plate 42 which carries most of transfer mechanism C. A horizontal bracket 43 is supported beneath inner side plate 26, front cross plate 27 and cross plate 41 to carry the drive for transfer mechanism C and also to support the motor and gear boxes by which the entire mechanism is driven. A motor bracket 43a is positioned on wrapper feed side plates 31 and 32 below bracket 43 (FIGURES 10 and 11), to support an electric motor, which drives the imprinter inker, and to support a primary gear box to a line shaft which drives all the other components.

Referring now particularly to FIGURES 3 and 4, an upper carrier roller 44 is journalled between side brackets 29 and 30 with its axis directly above and parallel to that of a backing roll 45 which is also journalled between said plates. Web W is wrapped over roll 44, between rolls 44 and 45, and extends beneath 45 along first infeed platform 36. In front of first infeed platform 36 is a shaft 46 carrying four spaced tape pulleys 47, and toward the front of first infeed table 36 is a shaft 48 carrying four tape pulleys 49, and a tape pulley 50 trained around each of the pairs of pulleys 47 and 49 extends along infeed table 36 to cooperate with backing roll 45 in advancing web W along the platform 36. A pair of upstanding brackets 51 at opposite sides of platform 36 immediately behind main roller 45 support a fixed cross shaft 52 on which are journalled four bearing arms 53 each of which has a roller 54 bearing upon web W immediately above one of the tapes 50. First infeed platform 36 is appropriately slotted where tapes 50 pass off of it and around tape pulleys 49.

A cross member 55 carries adjustable clamps 56 for tensioning arms 57 on which are journalled tensioning rolls 58 which bear against tapes 50 to adjust the tension of said tapes; and also mounted on cross member 55 are arms 59 carrying backing rollers 60 which project through slots (not shown) in infeed platform 36 between tapes 50 to back up the web where it passes beneath rollers 45.

A cross shaft 61 immediately adjacent front tape pulleys 47 carries a pair of scoring wheel clamp arms 62 upon each of which is spindled a scoring wheel 63 having scoring blades 64 extending circumferentially about its margin. Arms 62 are radially adjusted on shaft 61 to position the scoring knives 64 in firm contact with web W where the web passes around rollers 45, so that as the web is withdrawn from the supply roll it is provided with a pair of longitudinal scores L (see FIGURE 16) separating it into three connected parallel wrapper webs w1, w2, and w3.

Figures 10, 16:
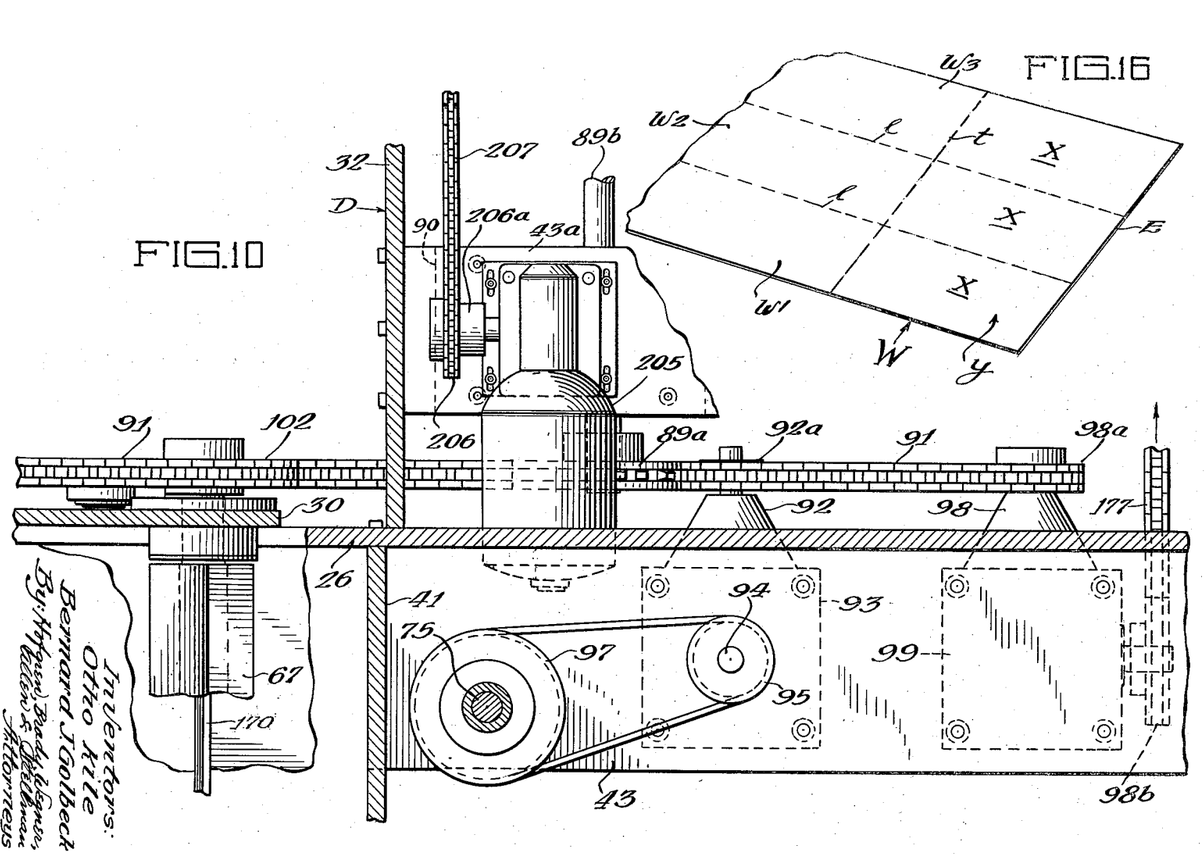
FIG. 10 is a fragmentary plan view of a portion of the transverse scoring knife, with the entire transfer table and associated parts broken away to show the main machine drive.
FIGURE 16 is a fragmentary perspective view of the free end of a paper web showing the arrangement of score lines by means of which it is divided into wrapper lengths each containing a plurality of wrappers side by side.

At the extreme inner margin of front infeed platform 36, and above the platform is a transverse scoring blade shaft 65 on which is mounted a transverse scoring blade carrier 67 on which a scoring blade 68 is detachably and adjustably mounted by means of bolts 69. Rotation of shaft 65 causes the scoring blade 68 to rotate regularly into contact with web W above an anvil 70 which is between first infeed platform 36 and second infeed platform 38, and scoring blade 68 produces the transverse scores t which are seen in FIGURE 16. Thus, the scoring wheels 63 and the scoring knife 68 cooperate to divide the web W into a series of connected wrapper lengths each containing three parallel wrappers x.

Figures 11, 12:
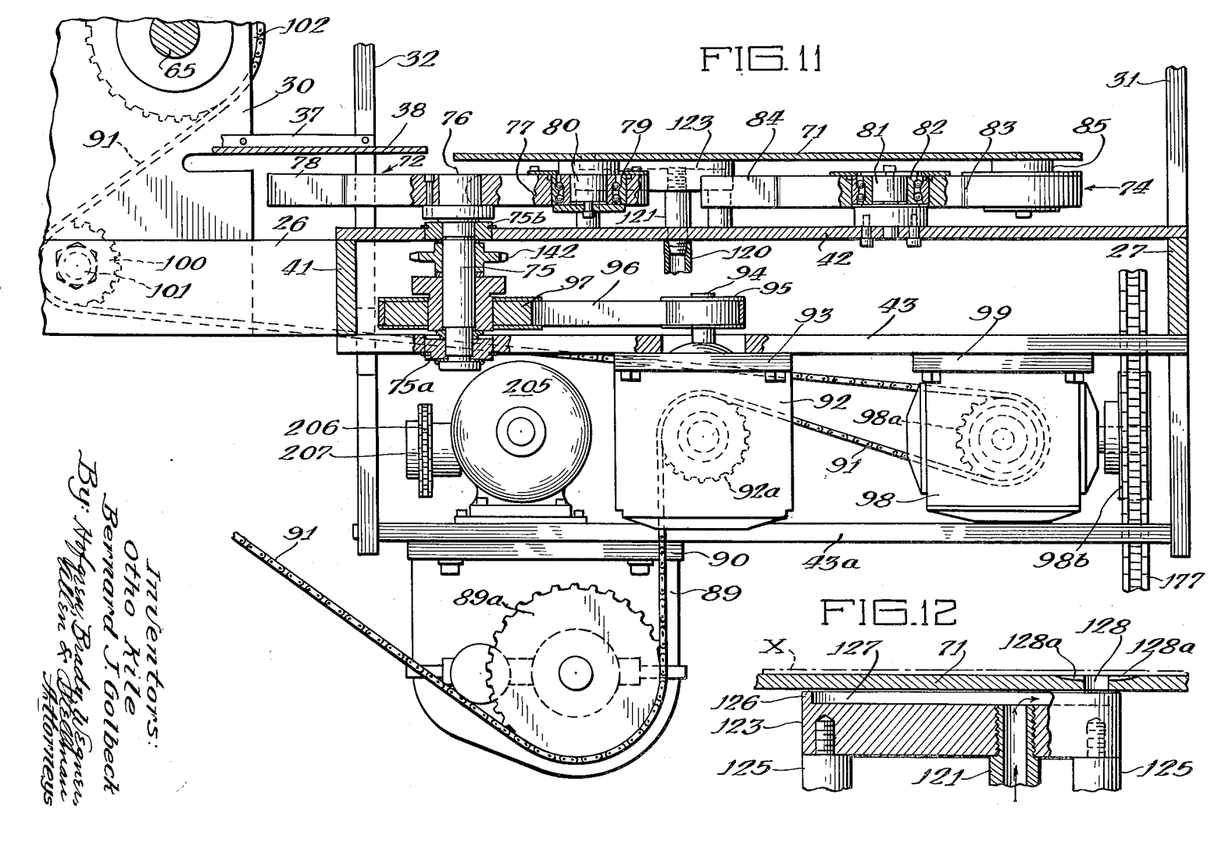
FIG. 11 is a fragmentary section on an enlarged scale taken substantially as illustrated along the line 11—11 of FIG. 1.
FIG. 12 is a fragmentary section on an enlarged scale taken substantially as illustrated along the line 12—12 of FIG. 3.

The transfer mechanism B is best seen in FIGURES 3, 4 and 11 to include a transfer table 71 which is mounted upon a drive crank assembly, indicated generally at 72, and a pair of idler crank assemblies, indicated generally at 73 and 74, respectively. Drive crank assembly 72 has a drive shaft 75 which is journalled in bearing blocks 75a and 75b positioned, respectively, in horizontal mounting bracket 43 and in top plate 42. Pinned to the upper end of drive shaft 75, above top plate 42, is a crank member 76 having a crank arm 77 and a counterweight 78. Crank arm 77 is recessed as seen in FIGURE 11 to receive a bearing assembly 79, and transfer table 71 has on its underside a fixed boss 80 which is carried in bearing assembly 79 so as to be rotatable within the recess in crank arm 77. The crank assemblies 73 and 74 are identical in construction, and are best seen in FIGURE 11 (illustrating assembly 74) to include an upright bearing boss 81 bolted to top plate 42, a bearing assembly 82 surrounding boss 81, a crank arm 83 rotatable about bearing assembly 82, said crank arm having a counterweight 84, and a table attaching assembly 85, which is similar to the assembly consisting of bearing 79 and bearing boss 80 of crank assembly 72. Thus, transfer table 71 may execute translatory motion in a close path on its crank assemblies 72, 73 and 74.

"Translatory motion in a closed path" is, as the term indicates, a motion of translation—i.e., with all points on the transfer table 71 traveling in the same direction and at the same speed at any given instant in time; and further, the table moves "in a closed path"—i.e., its path is a circle, an oval, or some other closed figure. Translatory motion in a closed path is similar to orbital motion, but the latter does not preclude axial rotation of the body as it travels through its orbit, while the former does.

As seen in FIGURES 3 and 4, journalled between cross plate 33 and burster bracket 34 is a burster shaft 86 on which is mounted a pair of burster arms 87 at the ends of which is a burster bar 88 on which is a plurality of tubular rubber burster cushions 88a. Rotation of burster shaft 86 is so timed with transverse scoring knife 68 and the translatory motion of transfer table 71 that when the leading end E of web W (FIGURE 16) is appropriately positioned with respect to the transfer table the burster pads 88a on burster bar 88 engage the leading wrapper length y of the web and draw it away from the balance of the web to burst it along the first transverse score line t.

The drive mechanism for infeed and scorer B, transfer mechanism C and burster is best seen in FIGURES 1, 3, 4, 10, 11 and 13. Referring first to FIGURES 1 and 11, a primary gear reducer 89 hung from a platform 90 on the under side of bracket 43a is driven by a line shaft 89b from a motor not shown) which also drives the magazine wrapper, and reducer 89 has a multiple primary sprocket 89a over which a multiple roller chain 91 is trained to drive infeed and scoring mechanism B, transfer mechanism C, the burster, and wrapper feed D. Roller chain 91 extends upwardly from sprocket 89a around input sprockets 92a on a gear box 92 which is suspended on a base plate 93 on the underside of horizontal bracket 43. Gear box 92 also has an output shaft 94 with a pulley 95 around which is trained a drive belt 96 to drive a pulley 97 on drive shaft 75 of crank assembly 72 from which transfer table 71 is driven.

From input sprockets 92a roller chain 91 extends around multiple sprockets 98a of a second gear box 98 which is suspended beneath bracket 43 on a platform 99 alongside gear box 92, and gear box 98 is provided with a shaft having an output sprocket 98b from which the wrapper feed D and imprinting mechanisms are driven.

From sprocket 98a the multiple drive chain 91 passes beneath an idler sprocket 100 which is journalled upon a stub shaft 101 mounted at the exteme lower end of inner roller bracket 30. From idler sprocket 101 chain 91 extends under and around a sprocket 102 which is keyed to the end of shaft 65 which carries the transverse scoring blade support 67. From sprocket 102 multiple roller chain 91 extends around a tensioning sprocket 103 which is journalled on a longitudinally adjustable stub shaft 104, said stub shaft being adjustable in a slot 104a in inner side plate 26 and inner roller bracket 30. From adjusting sprocket 103 multiple roller chain 91 returns to primary sprocket 89a.

Figure 13:
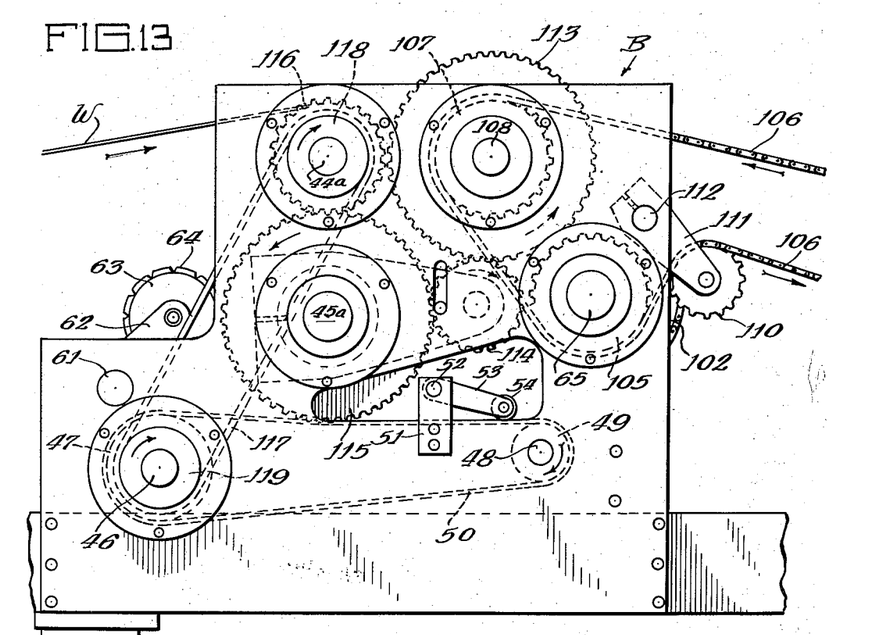
FIG. 13 is a fragmentary side elevation to illustrate the drive mechanism for the web feed and cutter.

Drive for the infeed rollers and burster is best seen in FIGURE 13 to be derived from a sprocket 105 which is mounted on shaft 65 of transverse scoring knife 68 immediately inside the outer roller support bracket 29. A secondary roller chain 106 is trained around sprocket 105 and around a sprocket 107 which is journalled on a stub shaft 108 extending inwardly from outer roller support bracket 29. From sprocket 107 secondary roller chain 106 is seen in FIGURE 3 to extend around a sprocket 109 which is keyed to burster shaft 86, and from the sprocket 109 said roller chain returns around a tensioning sprocket 110 to the sprocket 105. The tensioning sprocket is journalled on an adjusting arm 111 which is clamped to a supporting stud 112.

Also on stub shaft 108, and keyed to sprocket 107, is a drive gear 113 which meshes with an intermediate gear 114 which in turn meshes with a gear 115 keyed to a shaft 45a which is formed integrally with the end of main infeed roller 45. Upper carrier roller 44 in turn has reduced shaft 44a at its end on which is keyed a gear 116 which meshes with the gear 115 so as to drive the two rollers together.

Drive for the infeed tapes 50 is best seen in FIGURE 13 to be derived from a drive belt 117 which is trained around a drive pulley 118 on shaft 44a, and around a pulley 119 which is keyed to shaft 46 of the infeed tape mechanism.

It is apparent from the foregoing description of the drive mechanism for infeed and scoring mechanism B and for transfer mechanism C that all the elements of both mechanisms are coordinately driven by the multiple drive chain 91, a secondary drive chain 106, the gear train 113, 114, 115 and 116, the drive belt 117 for the infeed tapes and the drive belt 96 for the transfer table. Likewise, the wrapper feed and imprinting mechanism D is coordinately drive through sprocket 98b of gear box 98.

Figures 14, 15:
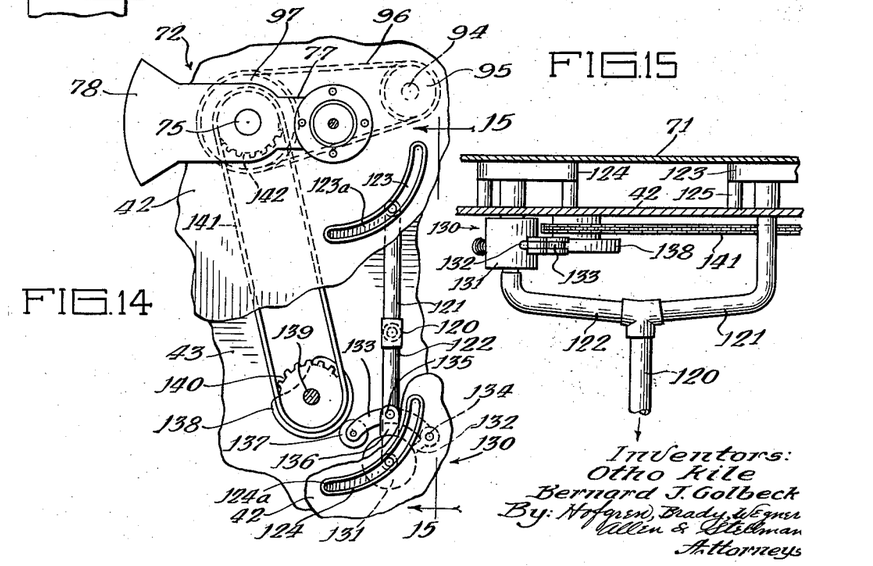
FIG. 14 is a fragmentary section taken substantially as illustrated along the line 14—14 of FIG. 4.
FIGURE 15 is a fragmentary section taken substantially as illustrated along the line 15—15 of FIGURE 14.

Transfer mechanism C also requires means for retaining each wrapper length on transfer table 71 during part of the translatory movement of the table, and this is accomplished by a vacuum system which is best seen in FIGURES 3, 11, 12, 14 and 15. Referring first to FIGURES 14 and 15, a vacuum line 120 which communicates with a vacuum pump (not shown) has branch lines 121 and 122 which extend upwardly through top plate 42 into arcuate vacuum manifolds 123 and 124, respectively. Referring now to FIGURE 12, which illustrates the vacuum manifold 123, the arcuate body 123 is supported upon legs 125 and has a continuous upstanding side wall 126 the top of which is in direct contact with the underside of transfer table 71, and the continuous side wall surrounds an arcuate manifold cavity 127. A vacuum holddown port 128 in transfer table 71 is seen FIGURE 3 to be so located in the table that is in communication with manifold cavity 127 during part of translatory movement of the transfer table. Port 128 has radial channels 128a to expand the area over which the vacuum may act upon a wrapper lengthy on the transfer table.

Manifold 124 is identical with manifold 123, and thus is not described in detail. The transfer table has a second vacuum port 129 which is in direct communication with an interior cavity 124a of arcuate manifold 124 during part of the travel of table 71. The radius of curvature of manifolds 123 and 124 is such that the vacuum ports 128 and 129 are under vacuum for the full length of the manifold cavities. It is apparent from the position of the parts in FIGURE 3 of the drawings that a wrapper length on the transfer table is held down by the vacuum system from the point of maximum travel of the table toward the outer side plate until the point shown in FIGURE 3. The remaining 270° of travel of the table the vacuum is cut off.

It is clear from the position of the parts that the edge 71a of table 71 which is tangent to manifold cavity 124a in FIGURE 3 will move across the manifold cavity during the continuing movement of the table, and to prevent the loss of vacuum which would result, vacuum branch line 122 is provided with a cut off valve system which is illustrated in FIGURES 14 and 15 and given reference numeral 130. A mechanical valve 131 is mounted in vacuum line 122 and has an actuating rod 132 to which a cam follower lever 133 is pivotally connected at 134. Lever 133 is pivotally mounted at 135 on a lever carrier arm 136 which extends outwardly from the casing of valve 131 and a follower roller 137 on lever 133 is in contact with the face of an actuating cam 138 which is journalled on a cam shaft 139. A sprocket 140 on the cam shaft received a drive chain 141 which is also trained around a drive sprocket 142 on shaft 75 of crank assembly 72 for the transfer table 71. The arrangement of valve 131 and cam 138 is such that the cam closes the valve at all times except when vacuum port 129 is in communication with manifold cavity 124a of manifold 124.

The operation of the infeed, scoring and transfer mechanism is believed to be clear from the foregoing detailed description of the mechanism. Web W is fed continuously from supply roll R, and is longitudinally scored by scoring wheel 63 and transversely scored by scoring blade 68. The translatory motion of table 71 carries it to a maximum infeed position which is shown in FIGURE 4 in broken lines, in which an edge 71b of the table extends beneath the second infeed platform 38 and into the recess 40 in roller brackets 29 and 30. FIGURES 17 to 20 of the drawings show the transfer table 71 in four different positions, and the position just described is that of FIGURE 17. By the time the table 71 reaches the position of FIGURE 18, the leading edge E of the web W occupies the position shown in that view, so that the entire first wrapper length y, back to the next transverse score line t, is upon the transfer table. At this point, as shown by the broken line position of burster bar 88 in FIGURE 4, the burster bar contacts the first wrapper length y and acts to draw it away from the balance of web W, bursting the web along the next transverse score line t. The vacuum also is applied to the web at this time since, as seen in FIGURE 3, the vacuum ports 128 and 129 move into register with their respective vacuum manifolds 123 and 124 at this point. The first wrapper length y remains on transfer table 71 under the control of vacuum mechanism 130 until the transfer table reaches the position of FIGURE 19, which is the position illustrated in FIGURE 3 and illustrated in full lines in FIGURE 4, at which point the vacuum hold down releases the wrapper length. During this time the balance of the paper web is moving forward so that, as seen in FIGURE 19, the leading edge E of the web substantially overlaps the foremost wrapper length y which is on the transfer table.

Figure 17:
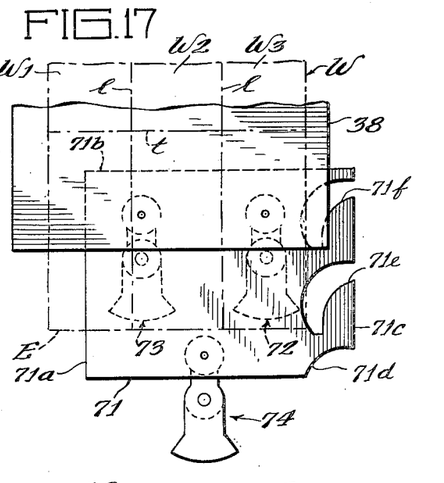
FIGURES 17 to 20 are a series of diagrammatic plan views to show the operation of the transfer table.
Figure 18:
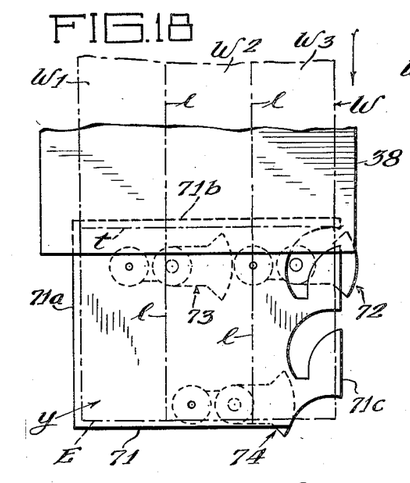
Figure 19:
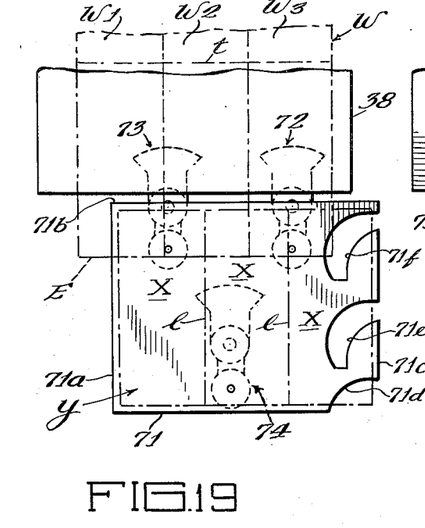

It is inherent in the movement of the transfer table that its component of velocity in the direction of movement of the web is zero at the positions of FIGS. 17 and 19, and reaches its maximum at the position of FIG. 18. Conversely, its component of velocity in the direction of the wrapper feed mechanism D is zero at the positions of FIGS. 18 and 20, and reaches its maximum at the position of FIG. 19. As previously stated, the first wrapper length y is burst from the web at the position of FIG. 18, when the table is at its maximum velocity with the web, and vacuum is applied to anchor the wrapper length to the table. As the table swings to the position of FIG. 19 its component of velocity with the web goes smoothly to zero, and its component of velocity toward the wrapper feed goes smoothly from zero to maximum, with no abrupt changes of direction. At this point the vacuum cuts off, as shown by the positions of the vacuum ports in FIG. 3; and the wrapper length y is free for movement on the table. As the table moves on toward the position of FIG. 20 it projects farther and farther between a set of forwarding rollers 143 (see FIGS. 5 and 6), and the movement of the wrapper length off of the table begins.

Figure 6:
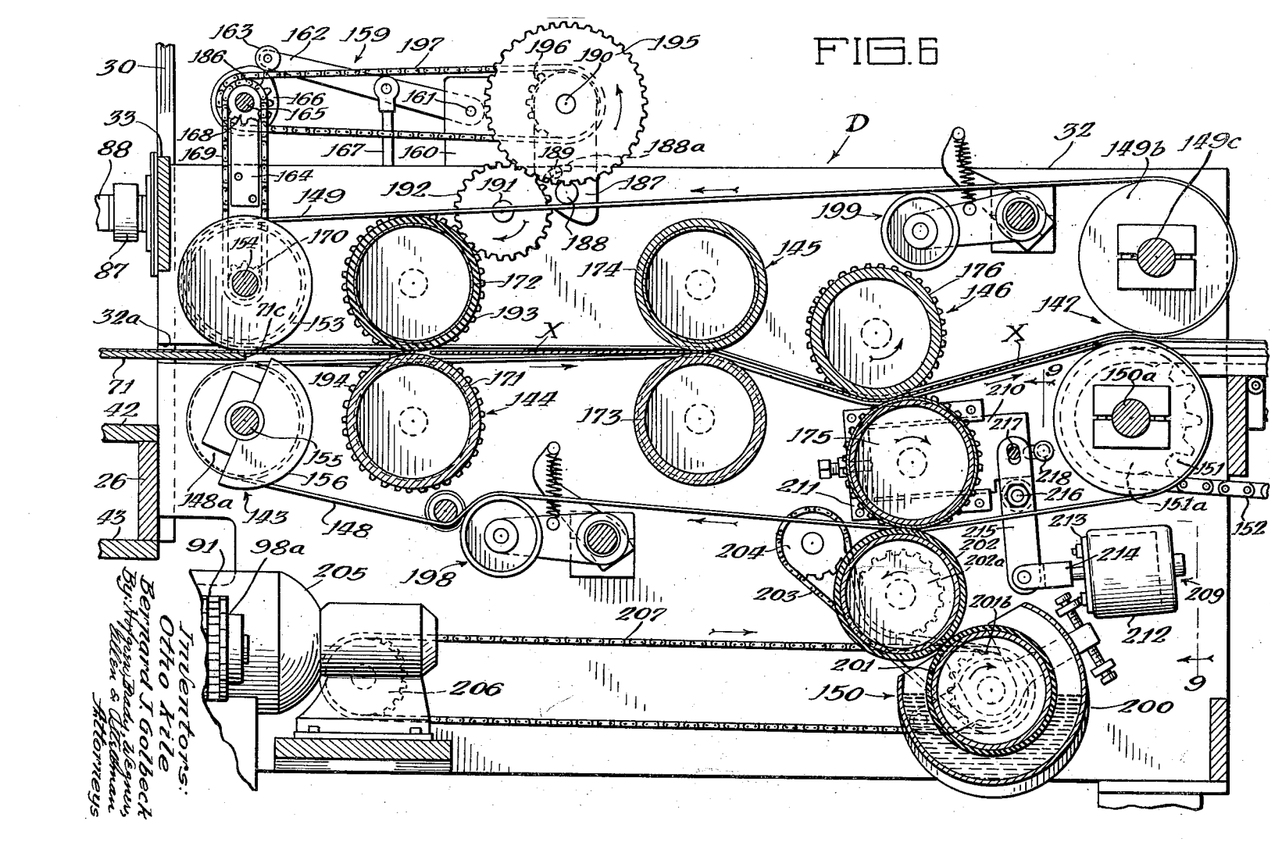
FIG. 6 is a fragmentary section on an enlarged scale taken substantially as illustrated along the line 6—6 of FIG. 5.

Wrapper feed and imprinting mechanism D is illustrated in FIGURES 5 to 9, and the arrangement of the drive chain is seen in FIGURE 1. As best seen in FIGURES 5 and 6, wrapper feed and imprinting mechanism D includes the forwarding roller set 143, a holding roller set, indicated generally at 144, a burster roller set, indicated generally at 145, an imprinting roller set indicated generally at 146, and a carrier tape roller set, indicated generally at 147, for lower carrier tapes 148 and upper tapes 149. The lower tapes 148 are carried on pulleys 148a which are journalled on a lower forwarding roller shaft 155 so as to be coaxial with a lower part of forwarding roller set 143, and upon rollers 151 carried on a shaft 150a. The upper tapes 149 are carried on pulleys 149a which are journalled on an upper forwarding roller shaft 154, so as to be coaxial with an upper portion of roller set 143, and upon pulleys 149b which are carried upon a shaft 149c. Also included is an imprinting inker mechanism, indicated generally at 150.

The rolls of forwarding roller set 143 are rotated at a slightly faster speed than the translatory motion of transfer table 71, while holding roller set 144 moves more slowly so as to retard the paper travel slightly as each wrapper length y is fed into the burster roller set 145 which again operates at higher speed than the holding rollers and is so spaced from the holding rollers as to burst each wrapper length along its two longitudinal score lines l and thus form three individual wrappers x from the wrapper length y. Accordingly, it is clear that one longitudinal score line l must be passing out of the nip of the holding rollers at 144 as the leading edge of the wrapper x is caught in the nip of the burster roller set 145. Since the imprinting must be coordinated to produce an imprint on each wrapper, the imprinting roller set 146 makes one revolution per wrapper. Finally, tape carrier roller set 147 has its lower roller 151 coaxial with the sprockets 151a for lugged wrapper carrier chains 152, so that the individual wrappers x are fed onto lugged chains 152 without any change of speed of the wrappers.

Figures 7, 8, 9:
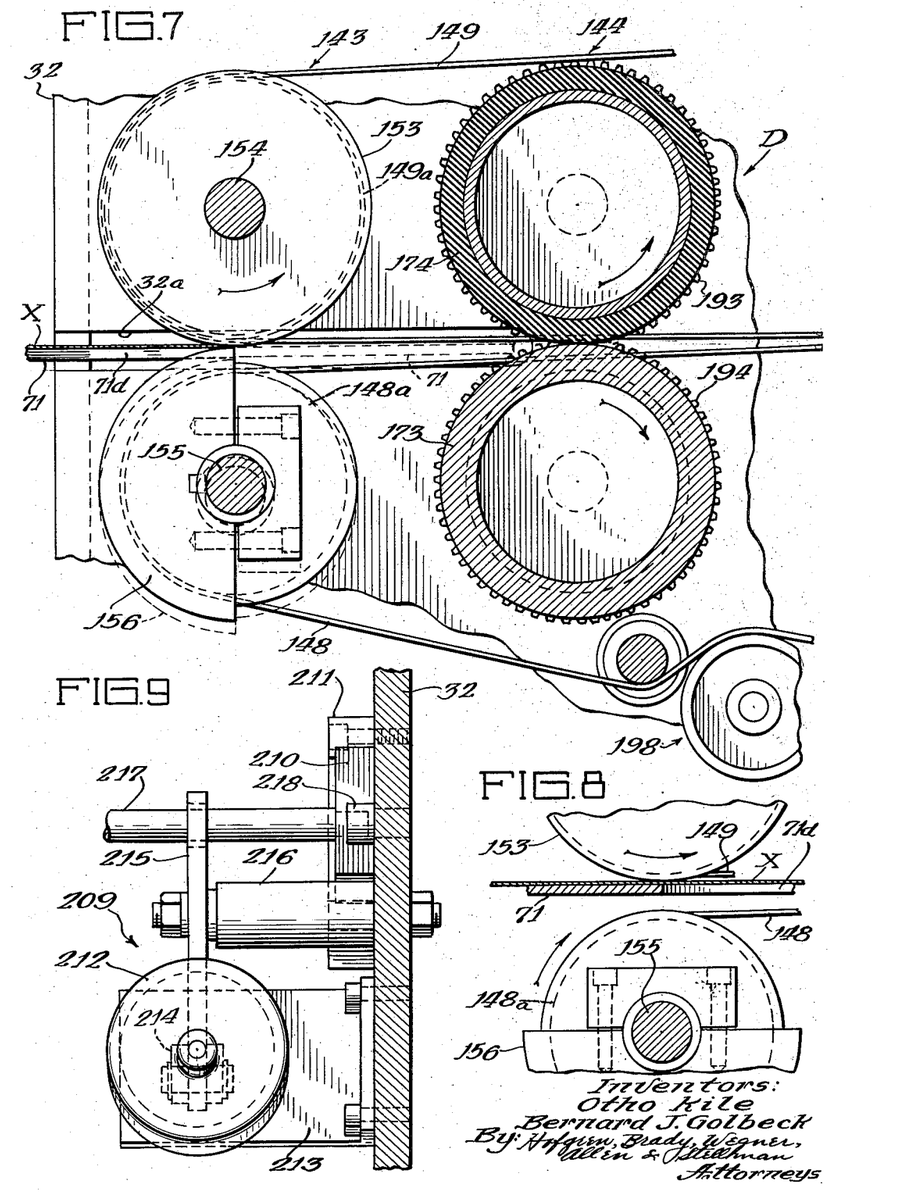
FIG. 7 is a fragmentary section on an enlarged scale, of the feed rollers which withdraw wrappers from the transfer table and holding rollers of a burster mechanism.
FIG. 8 is a fragmentary sectional view of the feed rollers and an edge portion of the transfer table at a different phase of the machine cycle from that illustrated in FIG. 7.
FIG. 9 is a fragmentary section on an enlarged scale taken substantially as illustrated along the line 9—9 of FIG. 6.

As seen in FIGURES 5, 6 and 7, forwarding roller set 143 includes three upper rollers 153 which are keyed on upper forwarding roller shaft 154, said shaft being journalled in wrapper feed side plates 31 and 32; while lower forwarding roller shaft 155 carries a roller segment 156 in register with each of the top forwarding rollers 153. Wrapper feed side plates 31 and 32 are slotted as seen at 32a in FIGURE 6, so that edge 71c of transfer table 71 may intersect the line of said side plates in the course of its translatory movement. The position of transfer table 71 in FIGURE 6 is the same as that in FIGURE 3, from which it can be seen that when the table moves on around to the position illustrated in FIGURE 20 its edge 71c extends almost to the holding roller set 144 (see FIG. 7 for this position); and it is for this reason that lower forwarding rollers 156 are in segmental form to permit an edge 71c of the transfer table to advance between the rollers 153 and 156 during its translatory movement from the position of FIGURE 19 to the position of FIGURE 20. In addition, the transfer table has a cut-out corner 71d and a pair of hook-shaped slots 71e and 71f providing clearance for the upper forwarding rollers 153. In addition to the clearance provided by the use of the lower roller segments 156, FIGURE 1 shows that lower roller shaft 155 is carried on a pair of mounting levers 157 which are pivoted at 158 in side plates 31 and 32, so that shaft 155 may be cyclically raised and lowered by the operation of a cam mechanism, indicated generally at 159, to provide clearance between table 71 and tape pulleys 148a of lower carrier tapes 148 which, as previously explained, are journalled on shaft 155 so as to be rotatable independently of the shaft.

Figure 20:
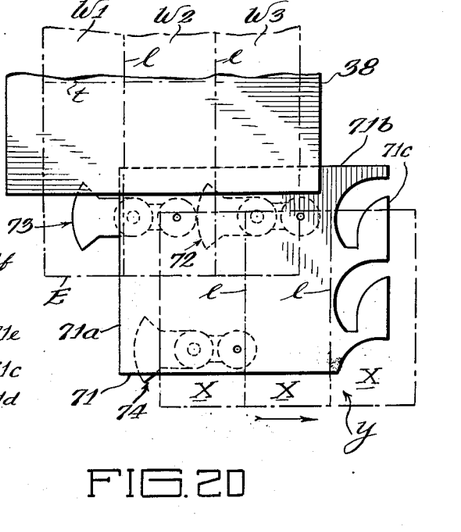

Comparison of FIGS. 6 and 7 shows plainly that as the table 71 moves from the position of FIG. 19 to that of FIG. 20 the upper carrier tapes 149 engage the wrapper length and start to move it linearly away from the transfer table, so as soon as the vacuum is released the wrapper length is under control of the tapes.

Cam mechanism 159 includes upstanding follower lever brackets 160 which are secured to side plates 31 and 32 and have pivots 161 for follower levers 162, each lever being provided with a cam follower 163. Upstanding cam shaft brackets 164 on side plates 31 and 32 support a cam shaft 165 at the two ends of which are cams 166 with which the cam followers 163 of cam levers 162 are in contact. The cam levers are connected by links 167 to the shafts supporting levers 157 so that the rotation of cams 166 raises and lowers shaft 155. Cam shaft 165 is provided with a sprocket 168 to receive a drive chain 169 which is also trained over a sprocket 170 on upper forwarding roller shaft 154, so that rotation of said shaft is transmitted to the cam shaft.

As best seen in FIGURE 6, each of the roller sets 144, 145 and 146 consists of two rollers, the set 144 having a lower holding roller 171 and an upper holding roller 172, set 145 having a lower burster roller 173 and an upper burster roller 174, and the imprinting roller set 146 having a plate cylinder 175 at the bottom and an impression cylinder 176 at the top. All of said rollers and cylinders are seen in FIGURE 5 to be mounted on shafts which are journalled in side plates 31 and 32, and immediately inside the side plate 31 certain of the shafts are seen in FIGURE 1 to be provided with drive sprockets. Thus, shaft 173a of lower holding roller 173 has a sprocket 173b, while the corresponding shaft 174a of the upper holding roller 174 has a sprocket 174b. A shaft 176a of imprinting impression cylinder 176 has a sprocket 176b, while the tape carrying shafts 150a and 149c are provided, respectively, with sprockets 150b and 149b. Drive for all of the last named components of the wrapper feed and imprinting mechanism, and also for inking mechanism 150, is derived from a single roller chain 177 which is seen in FIGURE 1 to be trained around output sprocket 98b of gear box 98, thence around an idler sprocket 178 which is rotatable on a stud 179, thence around a second idler sprocket 180 which is rotatable on a stud 181, thence around a third idler sprocket 182 which is rotatable on a pin 183 in a bracket 184 at the rear of the side plate 31, and from idler sprocket 182 the roller chain 177 is wrapped first around sprocket 150b to drive the lower tapes 148, then around sprocket 149d to drive the upper tapes 149, then to an idler sprocket 185 which is rotatable on a stud 185a to guide chain 177 away from sprocket 150b, thence around a sprocket 201a on an inking fountain roller 201, then around a sprocket 176b of imprinter impression roller 176, then around sprocket 173b of lower burster roller 173, then around sprocket 174b of upper burster roller 174, then around a drive sprocket 154a on upper forwarding roller shaft 154, and finally around the opposite side of a sprocket 155a on lower forwarding roller shaft 155. Thus, everything except the rollers of holding set 144 is driven off the single drive sprocket 98b through the roller chain 177.

Drive for the rollers 171 and 172 of holding set 144 is accomplished by a chain drive and gear train driven off a sprocket 186 on cam shaft 165. As seen in FIGURE 6, a drive gear carrying arm 187 is pivoted at 188 to side plate 32, and is slotted at 188a to receive an adjusting clamp nut 189 so that the position of a stub shaft 190 at the upper end of bracket 187 may be varied with respect to the position of a stub shaft 191 for an intermediate idler gear 192 which meshes with a gear 193 keyed to the shaft of upper holding roller 172. Said gear 193 in turn meshes with a gear 194 on the shaft of lower holding roller 171. Journalled on stub shaft 190 at the upper end of pivoted arm 197 is a main drive gear 195 which meshes with intermediate idler 192; and the reason for the adjustable mounting of bracket 187 is to permit the use of gears 195 of various sizes so as to change the speed of operation of the holding rollers when desired. A sprocket 196 pinned to gear 195 receives a drive chain 197 which is also trained around sprocket 186 on cam shaft 165, so that rotation of the cam shaft drives the gear train 195, 192, 193 and 194.

As seen in FIGURES 5 and 6, the rollers of roller sets 144, 145 and 146 are grooved to receive the delivery tapes 148 and 149; and suitable tensioning means are provided for the two tapes, as indicated generally at 198 for the tape 148 and 199 for the tape 149.

The inking mechanism 150 for the imprinter has been described only to the extent necessary to show the connection between the main roller drive chain 177 and sprocket 201a on the fountain roller 201. Referring now to FIGURE 6, it is seen that fountain roller 201 is mounted for rotation in an ink fountain 200, and has its surface in contact with a transfer roller 202 which also contacts plate cylinder 175 to ink the imprinting plate on said cylinder. A shaft for fountain roller 201 at the end opposite sprocket 201a is provided with a sprocket 201b from which a drive chain 203 is trained around an idler sprocket 204 so as to back wrap a sprocket 202a on the transfer roller 202. Thus both fountain roller 201 and transfer roller 202 are positively driven by chain 177.

As is usual in equipment such as the present imprinting mechanism, it is essential that when the wrapper feed is stopped the fountain roller and transfer roller be driven at slow speed to keep ink from drying upon them; and this also requires that plate cylinder 175 be moved out of contact with transfer roller 202. Accordingly, the shaft shaft between sprocket 201a and fountain roller 201 is provided with a conventional overruning clutch (not shown) to permit the fountain roller to be driven independenly of roller chain 177. The slow speed drive of the inking mechanism is accomplished through a gear head electric motor 205 which has an overrunning clutch 206a (FIGURE 10) on its shaft and a sprocket 206 from which a drive chain 207 is trained around an auxiliary drive sprocket 208 (FIGURE 5) which is on the shaft of fountain roller 201 immediately adjacent the sprocket 201b for driving the transfer roller 202. The two overrunning clutches heretofore mentioned permit the inking system to operate selectively either independently of auxiliary motor 205 or independently of drive chain 177.

Withdrawal of plate cylinder 175 from contact with transfer roller 202 is accomplished by a solenoid linkage mechanism, indicated generally at 209, which is best seen in FIGURES 6 and 9. Plate cylinder 175 is supported on slide plates 210 which are mounted for linear movement in guideways 211 on side plates 31 and 32. An actuating solenoid 212 carried on a bracket 213 has its plunger 214 pivotally connected to a lever 215 which is rockable on a stud 216 and makes a pin and slot connection with a cross rod 217 the two ends of which are secured to slide plates 210. A slide plate stop 218 is adjustably mounted in each of the side plates 31 and 32 to adjustably limit the travel of slide plates 210. Solenoid 212 is automatically energized to move slide plates 210 against stops 218 when the main drive motor 89 is stopped. Simultaneously, inker auxiliary motor 205 is started. Conversely starting drive motor 89 automatically terminates operation of motor 205 and de-energizes solenoid 212.

The foregoing detailed description is given for clarity of understanding only and no necessary limitations are to be understood therefrom, as some modifications will be obvious to those skilled in the art.

We claim:

1. Apparatus for cutting and feeding wrappers for magazines, comprising: means for continuously withdrawing a paper web from a supply roll; means for scoring said moving web transversely at regular intervals to define a continuous series of connected wrappers; means for severing said moving web progressively to provide separate wrappers; a horizontal transfer table to receive said wrappers seriatim; means for continuously moving said table in a translatory, closed path about a vertical center so that each individual wrapper is carried continuously from a position in line with said supply roll in an arcuate path to a position offset laterally from the line of the supply roll; means for retaining each wrapper on the table without rotation during a part of the table movement; forwarding means to withdraw said individual wrappers from the table in a path at right angles to the line of movement of the web without stopping or rotating the wrappers, to provide a succession of spaced wrappers; and feed means for receiving said spaced wrappers seriatim from the table, and moving said succession of spaced wrappers continuously to a wrapping station.

2. In apparatus for cutting and feeding wrappers for magazines, in combination: a horizontal transfer table; means for continuously moving said table in a translatory closed path about a vertical center; means for feeding a series of wrapper lengths onto the transfer table at a first point in the path of the table, each wrapper length consisting of a plurality of parallel, connected wrappers positioned side by side and having score lines therebetween; means for retaining each wrapper length on the table without rotation during part of the table movement; a pair of forwarding rollers at right angles to the line of travel of the web and positioned so that a margin of the moving table enters the nip of the rollers in a portion of said translatory closed path, whereby said forwarding rollers withdraw each wrapper length transversely from the table at a predetermined point on said closed path; burster mean cooperating with said forwarding rollers to burst each wrapper length serially along the several parallel scores to provide a succession of individual, spaced wrappers; and feed means for continuously moving said succession of spaced wrappers serially to a wrapping station.

3. The apparatus of claim 2 in which the forwarding rollers include a lower roller which has a recess in a portion of its surface to provide clearance for the margin of the table, and a gripping portion which rotates into contact with the underside of the wrapper length after the table has moved out of the nip of the rollers.

4. The apparatus of claim 2 in which the burster means includes a pair of holding rollers spaced from the forwarding rollers; a pair of burster rolls spaced from the holding rollers; and means for intermittently vertically separating the forwarding rollers to prevent buckling the wrapper lengths between said forwarding rollers and the holding rollers.

5. Apparatus for cutting and feeding wrappers for magazines, comprising: a frame; a fixed, horizontal platform mounted on said frame, there being a recess beneath an edge portion of said platform; a horizontal transfer table; means for continuously moving said table in a translatory closed path about a vertical center with an edge portion of the table moving through said recess; means for feeding a connected series of wrappers continuously across the platform and onto the transfer table; means for severing the leading wrapper on the transfer table while said edge portion of the table is in said recess, the movement of said table segregating said leading wrapper from the series; means for retaining the leading wrapper on the table without rotation during part of the table movement; forwarding means for moving said leading wrapper off the table in a path at right angles to the feed of said connected series of wrappers to provide a succession of spaced wrappers; and feed means for continuously moving said succession of spaced wrappers serially to a wrapping station.

6. Apparatus for cutting and feeding wrappers for magazines, comprising: a frame; a fixed, horizontal platform mounted on said frame, there being a recess beneath an edge portion of said platform; a horizontal transfer table; means for continuously moving said table in a translatory closed path about a vertical center with an edge portion of the table moving through said recess; means for feeding a connected series of wrapper lengths continuously across the platform and onto the transfer table, each wrapper length consisting of a plurality of connected wrappers side by side; means for severing the leading wrapper length on the transfer table while said edge portion of the table is in said recess, the movement of said table segregating said leading wrapper length from the series; means for retaining the leading wrapper length on the table without rotation during part of the table movement; forwarding means for moving said leading wrapper length off the table in a path at right angles to the feed of said connected series of wrapper lengths; burster means for segregating the wrappers successively from the remainder of the wrapper length to provide a succession of individual spaced wrappers; and feed means for continuously moving said succession of spaced wrappers serially to a wrapping station.

7. The apparatus of claim 6 in which the means for moving the leading wrapper length off the table comprises a pair of forwarding rollers including a lower roller which has a recess in a portion of its surface to provide clearance for the margin of the table, the path of the table is such as to move a marginal portion of the table in and out of the nip of the rollers, and said lower roller has a gripping portion which rotates into contact with the underside of the wrapper length after the table has moved out of the nip of the rollers.

8. The apparatus of claim 7 in which the burster means includes a pair of holding rollers spaced from the forwarding rollers, a pair of burster rollers spaced from the holding rollers, and means for intermittently vertically separating the forwarding rollers to prevent buckling the wrapper lengths between said forwarding rollers and the holding rollers.

9. The method of cutting and feeding wrappers for magazines which comprises the steps of: continuously withdrawing a paper web from a supply roll in a first linear path; forming transverse scores in the moving web at regular intervals to define a continuous series of connected wrapper lengths extending lengthwise of the web; severing the moving web progressively on said scores to provide individual wrappers; moving said wrappers seriatim in a translatory, closed path through an arc of about 90° from said first path into a second path at right angles to the first path; subjecting each wrapper to suction during its travel in said translatory path to maintain its angular orientation with respect to said paths; moving each individual wrapper momentarily along said second path at a speed greater than that of the succeeding moving wrappers to provide a succession of individual, spaced wrappers; and continuously moving said succession of spaced wrappers serially to a wrapping station.

10. The method of cutting and feeding wrappers for magazines which comprises the steps of: continuously withdrawing a paper web from a supply roll in a first path; continuously forming several parallel, longitudinal scores in said moving web to define a plurality of connected parallel wrapper webs; forming transverse scores in the parallel webs at regular intervals to define a continuous series of moving connected wrapper lengths; severing the moving webs progressively on said transverse scores to provide a series of spaced wrapper lengths each containing a plurality of connected wrappers side by side; moving said wrapper lengths seriatim in a translatory, closed path through an arc of about 90° from said first path into a second path at right angles to the first path; subjecting each wrapper length to suction during its travel in said translatory path to maintain its angular orientation with respect to said paths; bursting each moving wrapper length progressively on the several longitudinal scores by moving each wrapper momentarily at a speed greater than any succeeding wrapper to provide a succession of individual, spaced wrappers; and continuously moving said succession of spaced wrappers serially to a wrapping station.

11. The method of cutting and feeding wrappers for magazines which comprises the steps of: continuously withdrawing a paper web from a supply roll in a first linear path; forming transverse scores in the moving web at regular intervals to define a continuous series of connected wrappers extending lengthwise of the web; bursting the web progressively on said scores to provide individual wrappers; anchoring each of said wrappers upon bursting; transferring each anchored wrapper in an arcuate path from said first path to a position offset laterally from the first path and into a second linear path at right angles to the first path; and releasing each said wrapper at the termination of said arcuate path and immediately gripping and feeding it along said second path.

12. The method of cutting and feeding wrappers for magazines which comprises the steps of: continuously withdrawing a paper web from a supply roll in a first path; continuously forming several parallel, longitudinal scores in said moving web to define a plurality of connected parallel wrappers webs; forming transverse scores in the parallel webs at regular intervals to define a continuous series of moving connected wrapper lengths each containing several connected wrappers side by side; bursting the web progressively on said transverse scores to provide a plurality of connected wrappers side by side; anchoring each of said wrapper lengths upon bursting; transferring each anchored wrapper length in an arcuate path from said first path to a position offset laterally from the first path and into a second linear path at right angles to the first path; releasing each said wrapper length at the termination of said arcuate path and immediately gripping and feeding it along said second path to space it from the next said wrapper length; bursting the wrapper lengths seriatim in said second path to provide a succession of individual spaced wrappers; and continuously moving said succession of individual spaced wrappers serially to a wrapping station.

13. In apparatus for cutting and feeding wrappers for magazines, in combination: a horizontal transfer table; means for continuously moving said table in a translatory closed path about a vertical center; means for feeding a series of wrappers traveling continuously in a first linear path onto the transfer table seriatim in a portion of said translatory closed path where the table is moving rapidly in the same general direction as said wrappers; means for anchoring each of said wrappers against movement on the transfer table; forwarding means for removing said wrappers from the table and forwarding them in a second path at a right angle to the first path, said forwarding means removing said wrappers in a portion of the translatory closed path where the table is moving rapidly in the general direction of said second path; means for releasing the anchoring means when each wrapper reaches the forwarding means; and feed means for moving said wrappers serially along said second path to a wrapping station.

14. In apparatus for cutting and feeding wrappers for magazines, in combination: a horizontal transfer table; means for continuously moving said table in a translatory closed path about a vertical center; means for feeding a series of wrapper lengths traveling continuously in a first linear path onto the transfer table in a portion of said translatory closed path where the table is moving rapidly in the same general direction as said wrapper lengths, each wrapper length consisting of a plurality of parallel connected wrappers positioned side by side and separated by score lines; means for anchoring each of said wrapper lengths against movement on the transfer table; forwarding means for removing said wrapper lengths from the table and forwarding them in a second path at a right angle to the first path, said forwarding means removing said wrappers in a portion of the translatory closed path where the table is moving rapidly in the general direction of said second path; means for releasing the anchoring means when each wrapper reaches the forwarding means; means for separating each wrapper length successively along its score lines to provide a succession of wrappers; means for spacing each wrapper from those following it; and feed means for continuously moving said wrappers serially to a wrapping station.

References Cited in the file of this patent
UNITED STATES PATENTS

| | | |
|---|---|---|
| 2,266,995 | Schultz et al. | Dec. 23, 1941 |
| 2,639,772 | Sandberg et al. | May 26, 1953 |
| 3,008,709 | Buslik | Nov. 14, 1961 |